(12) United States Patent
Specht et al.

(10) Patent No.: US 7,180,258 B2
(45) Date of Patent: Feb. 20, 2007

(54) CONTROLLING CURRENT SUPPLIED TO ELECTRIC MOTOR OF A SEAT BELT RETRACTOR

(75) Inventors: Martin Specht, Feldafing (DE); Alexander Heckmayr, Ottobeuren (DE); Christian Liedl, München (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 330 days.

(21) Appl. No.: 10/911,245

(22) Filed: Aug. 4, 2004

(65) Prior Publication Data

US 2005/0083000 A1   Apr. 21, 2005

(30) Foreign Application Priority Data

Aug. 6, 2003   (DE) ................. 103 36 122

(51) Int. Cl.
   *H02P 27/00*   (2006.01)
(52) U.S. Cl. .............. 318/432; 318/433; 318/434; 318/798
(58) Field of Classification Search ........... 318/432, 318/433, 434, 268, 626, 798, 280, 430; 280/806; 180/268; 388/907.5
   See application file for complete search history.

(56) References Cited

U.S. PATENT DOCUMENTS

| 4,572,543 | A | 2/1986 | Kuwakado et al. |
|---|---|---|---|
| 4,655,312 | A | 4/1987 | Frantom et al. |
| 5,788,281 | A | 8/1998 | Yanagi et al. |
| 6,213,512 | B1 | 4/2001 | Swann et al. |
| 6,485,057 | B1 | 11/2002 | Midorikawa et al. |
| 2001/0054816 | A1 | 12/2001 | Brambilla et al. |
| 2003/0102659 | A1* | 6/2003 | Frank .................. 280/806 |

FOREIGN PATENT DOCUMENTS

| DE | 196 36 448 A1 | 4/1997 |
|---|---|---|
| DE | 199 54 878 A1 | 6/2000 |
| DE | 100 05 010 A1 | 8/2001 |
| DE | 101 60 071 A1 | 6/2003 |
| EP | 0 893 313 A2 | 1/1999 |
| GB | 2 372 822 B | 11/2002 |

* cited by examiner

*Primary Examiner*—Karen Masih
(74) *Attorney, Agent, or Firm*—Lonnie Drayer

(57) ABSTRACT

A method and a device for adjusting a supply current, which feeds an electric motor, the torque of which is transferred to a belt reel of a seat belt retractor of a motor vehicle, whereby the motor current of the electric motor is measured during the torque generation and compared as a controlled variable with a command variable, which is adjusted depending on at least one driving situation or at least one driving condition of the vehicle, for controlling the supply current for the electric motor situated in the control circuit.

9 Claims, 6 Drawing Sheets

CONTROLLING CURRENT SUPPLIED TO ELECTRIC MOTOR OF A SEAT BELT RETRACTOR

FIELD OF THE INVENTION

The invention relates to a method and a device for adjusting a supply current to an electric motor, the torque of which is transferred to a belt reel of a seat belt retractor of a motor vehicle.

BACKGROUND OF THE INVENTION

It is known from EP 0893313 B1 to transfer varying torques to the belt reel by means of an electric motor, which can be connected via a gear to the belt reel of a seat belt retractor, depending on required safety functions and restraint functions of the seat belt.

From U.S. Pat. No. 4,655,312 it is known to measure the motor current to determine a belt webbing force exceeding a threshold value on the shoulder restraining a vehicle occupant, created by the electric motor connected to the belt reel.

SUMMARY OF THE INVENTION

According to the present invention, depending on varying driving situations or driving conditions of the vehicle, requiring certain safety functions, varying supply currents are supplied to the electric motor. In each case the supply current is adjusted with the help of a control circuit, in which the electric motor is arranged. In this case the motor current of the electric motor is measured and compared as a controlled variable with a command variable, which is adjusted depending on the desired safety function arising from the driving situation or in each case the driving condition of the vehicle. Depending on the comparison result, that is to say deviation from a standard, the supply current to the electric motor is adjusted. The torque supplied by the electric motor and thus the pulling force acting on the belt webbing are proportional to the adjusted supply current. The adjustment of the supply current is achieved by adapting the command variable to each required safety function. The electric motor preferably is preferably a brushless direct current motor. The supply current is supplied by a current source located in the vehicle, for instance a vehicle battery or an electrical memory or the like which can be reversibly charged within a relatively short time frame.

DETAILED DESCRIPTION OF THE INVENTION

Figure 1:
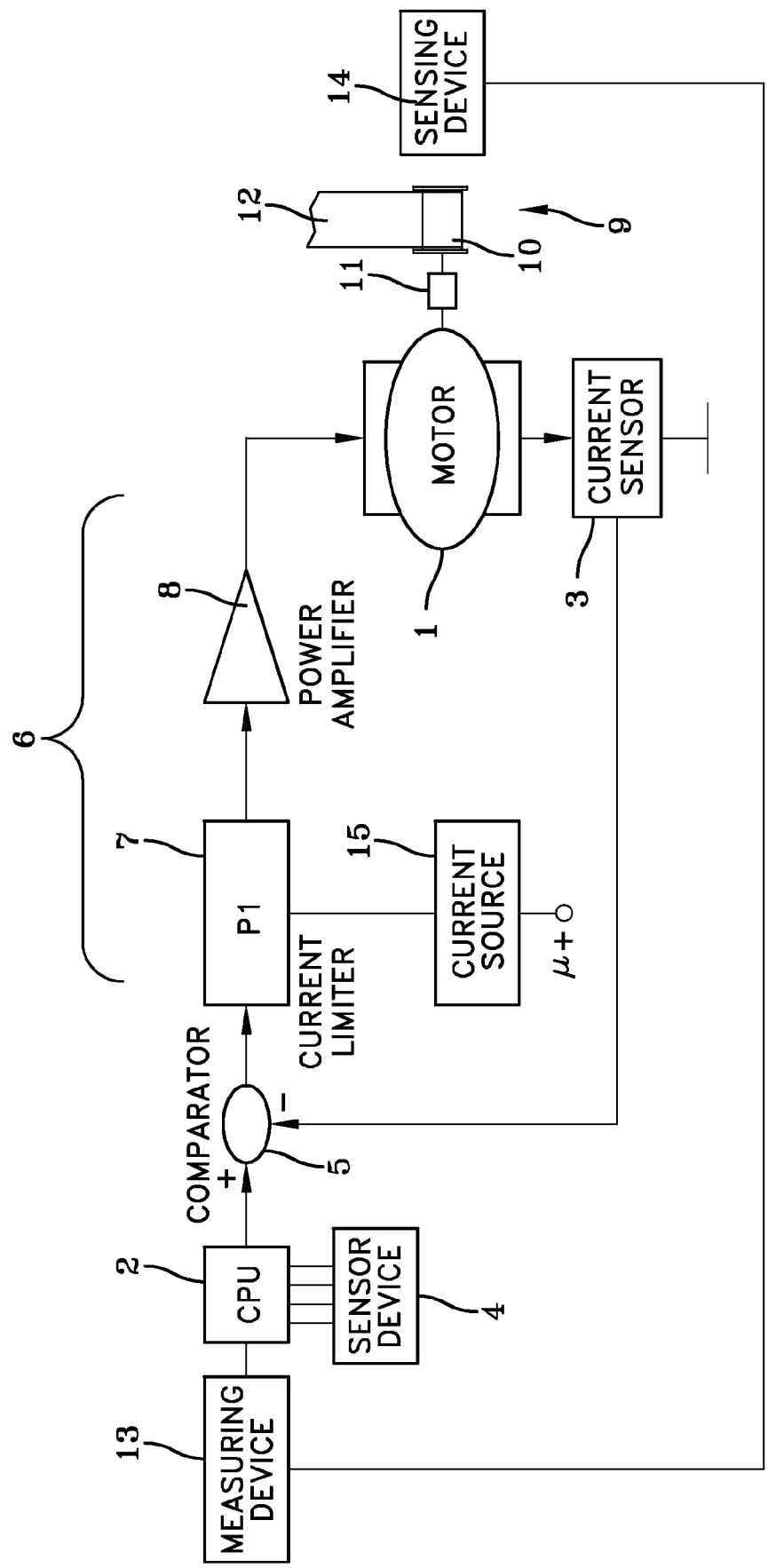
FIG. 1 is a block diagram of an embodiment.

The embodiment shown in FIG. 1 comprises an electric motor 1, which transfers a torque to a belt reel 10 of a seat belt retractor 9, by a torque transmission device 11, for instance a gear, coupling or the like. The torque of the electric motor 1 can take effect in both directions of rotation, i.e. in the winding direction and the unwinding direction. A seat belt 12 is wound onto or unwound from on the belt reel 10. The seat belt 12 and the belt retractor 9 are associated with a seat in a motor vehicle.

The electric motor 1 is arranged in a control circuit, in which the supply current supplied to the electric motor 1 is controlled. The control circuit comprises a current measuring device 3, with which the motor current of the electric motor is measured when torque is transferred to the belt reel 10. The current measuring device 3 is connected to a comparator 5 of the control circuit. The measuring signal of the current measuring device 3 creates within the control circuit a controlled variable, which is compared with a command variable in the comparator 5. The command variable is created depending on sensor signals of a sensor device 4 and/or measuring signals of a measuring device 13 or sensing device 14. To this effect a command variable generator 2 is connected to the measuring device 13 and the sensor device 4, for instance in the form of a computer or application specific integrated circuit that evaluates the sensor signals and measuring signals. The command variable generator 2 is connected to the comparator 5 for supplying the command variable.

The comparator 5 can also be integrated within the computer or application specific integrated circuit, which comprises the command variable generator 2.

The deviation generated in the comparator 5 and arising from the difference between the command variable and the controlled variable controls a current limiter 7 in a supply current circuit 6. The current limiter 7 adjusts the current supplied by a current source 15 in the vehicle to a desired correcting variable. The current source 15 can consist of a vehicle battery, an electrical memory which can be reversibly charged within a predetermined time frame, in particular on a capacity basis, or a different current source present in the vehicle. The supply current adjusted by the current limiter 7 can if necessary be supplied to the electric motor 1 by means of a power amplifier 8 located in the supply current circuit 6.

Without changing the control circuit and the torque transmission path between the electric motor 1 and the belt reel 10 of the belt retractor 9, varying safety functions of the seat belt 12 can be adjusted to a constant set value or a changeable set value by means of corresponding adjustments of the command variable.

Figure 2:
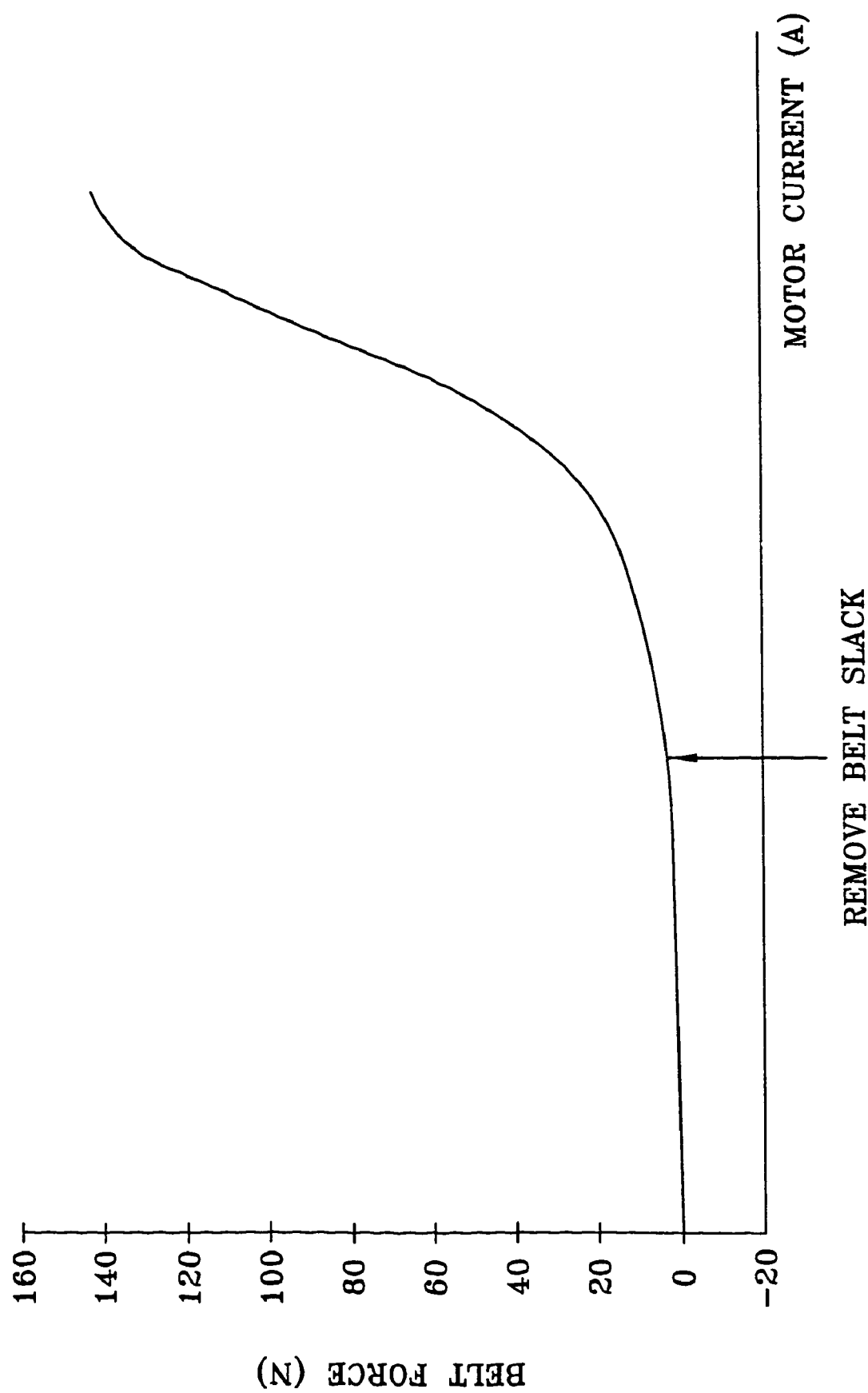
FIGS. 2 to 4 are diagrams for the belt force depending on the motor current, which is evaluated for varying safety functions of the seat belt.

During normal vehicle operating conditions, it is desirable that the seat belt 12 is in contact with the vehicle occupant's body with only a particular contact force, whereby the slack is removed from the seat belt. As can be seen in FIG. 2, this state can be adjusted by a command variable, which corresponds to a relatively low belt force and thus a relatively low supply current as a correcting variable. In FIG. 2, this belt force and the corresponding motor current are represented by an arrow and the indication "remove belt slack". The current control circuit in FIG. 1 ensures that this desired comfort is perceived by a vehicle occupant restrained by a seat belt is adjusted.

In addition, after the application of the seat belt about a vehicle occupant, a reference position can be determined and memorized with a belt force and a corresponding motor current, which are measured to be higher than the belt force and motor current indicated in FIG. 2 for the removal of the slack. The reference position indicates the belt position into which, in a potential crash situation (pre-crash situation), the seat belt is to be brought. In this position a corresponding torque is transferred from the motor 1 to the belt reel 10, corresponding to the belt force on the seat belt indicated in FIG. 3 by the "reference position". The electric motor is in this case supplied by the corresponding supply current, which is generated in the current control circuit shown in FIG. 1. For the position recognition of the position of the seat belt 12 required for this case, an optical or other device monitoring the belt extraction length can be foreseen. In addition, a device sensing the rotational movement of the belt reel 10, as is for instance known from U.S. Pat. No. 6,290,159 B1, can be foreseen. A monitoring/sensing device 14 represented in FIG. 1 for the belt reel 10 or the belt extraction length is connected to the measuring device 13 or is a component of this measuring device.

Figure 3:
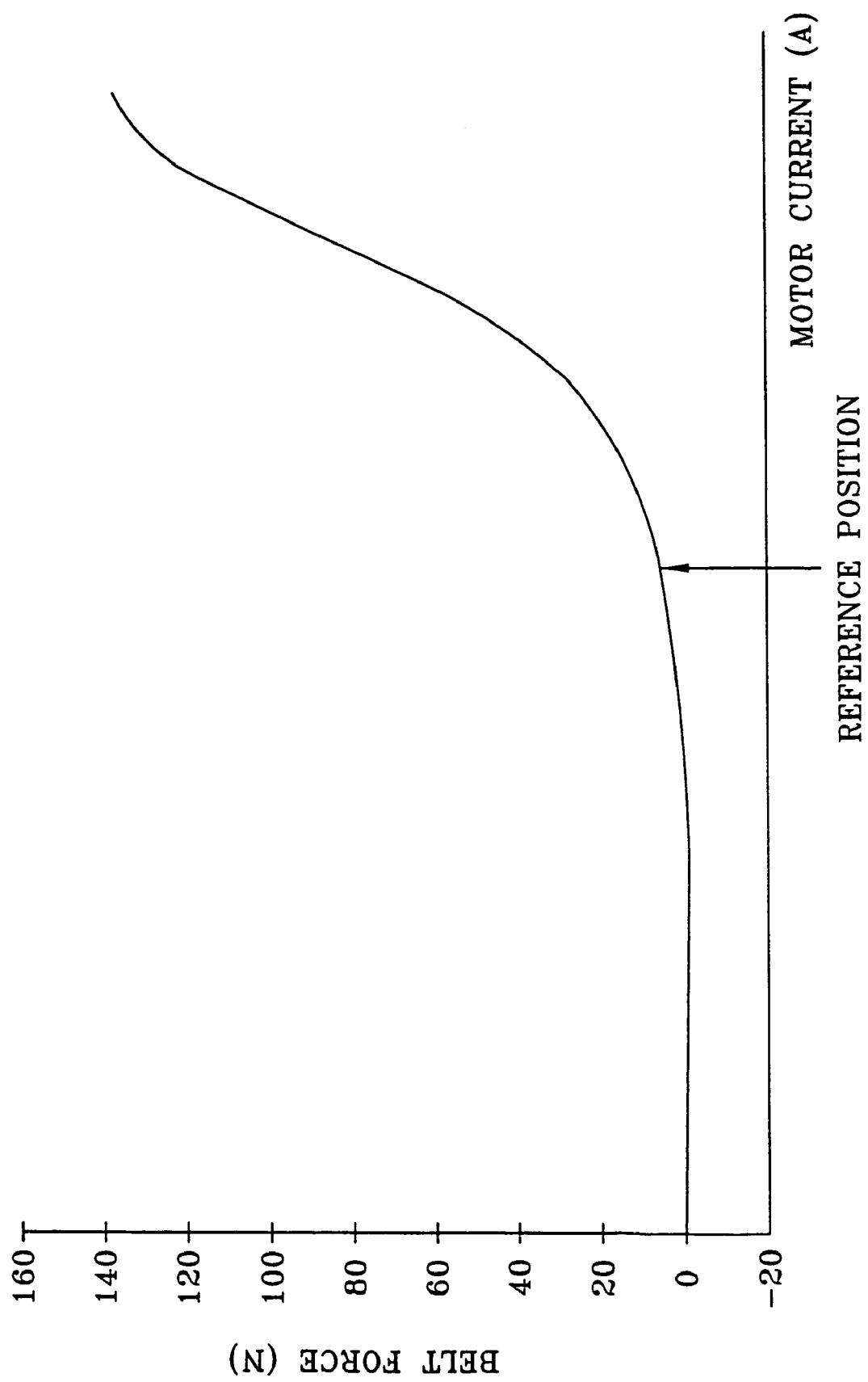

The reference position of the seat belt represented in FIG. 3 can also be adjusted for a comfort setting of the vehicle seat or by operating/comfort elements.

Critical driving situations can be detected by sensors of the sensor device 4 detecting the dynamic operating behavior of the vehicle. Depending on these sensor signals, a corresponding command variable is created in the command variable generator 2 and, for an adapted tightening of the seat belt 12, the electric motor is supplied with a correspondingly adjusted supply current via the supply current circuit 6.

Figure 4:
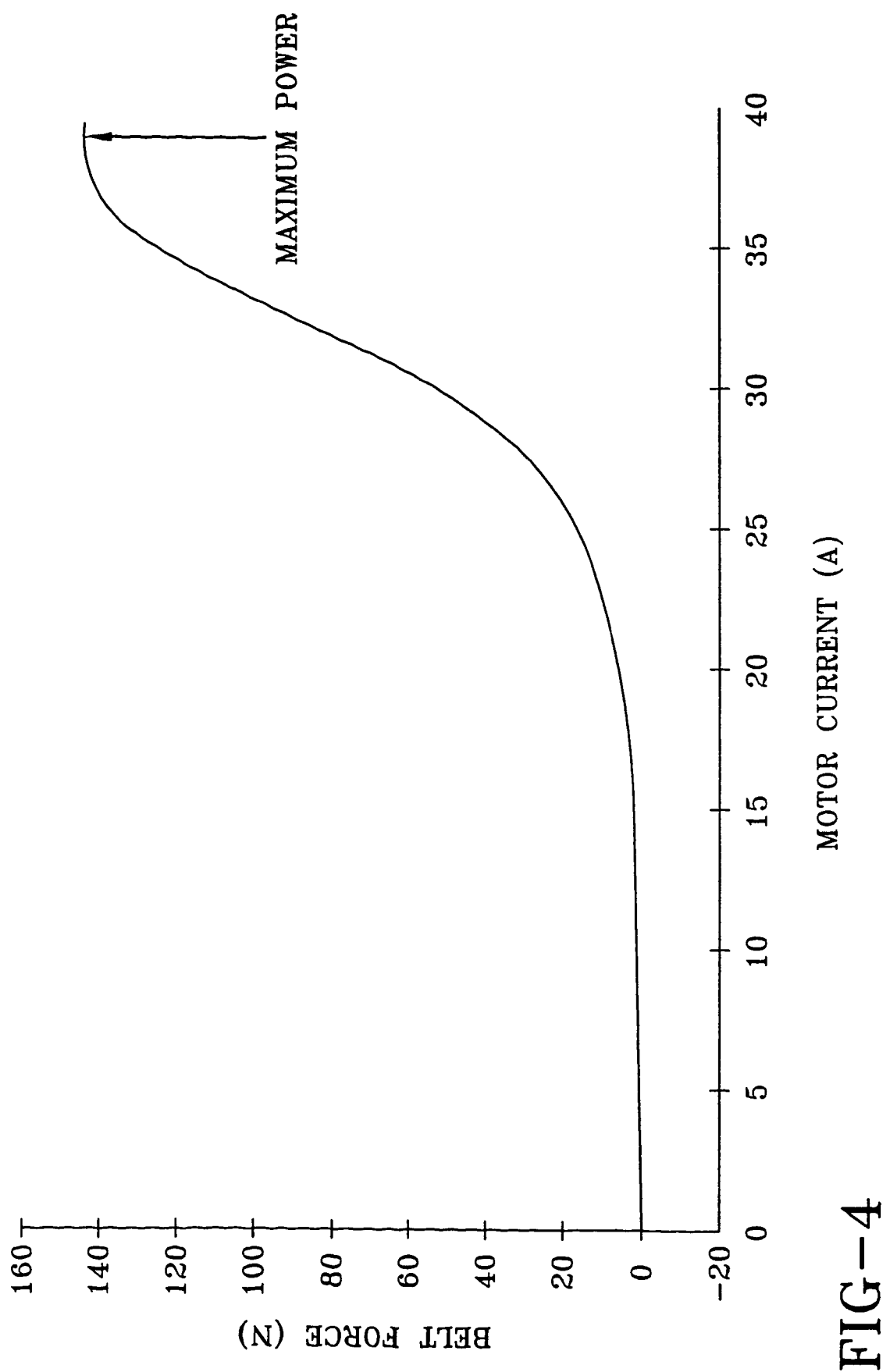

If an imminent crash is detected by approximation sensors, for instance radar sensors, of the sensor device 4, the command variable is correspondingly adjusted by the command variable generator 2 in such a manner that via the control circuit a supply current is supplied to the electric motor 1 with a maximum current strength, as is shown in FIG. 4. The electric motor then transfers a maximum torque to the belt reel 10, to tighten the seat belt 12 with the corresponding pulling force, in particular to pretension it.

The command variable generator 2 can create command variables corresponding to in each case the supplied sensor signals of the sensor device 4. These can be sensor signals that are supplied by the brake assistant, the driving dynamics control, for instance the antilock braking system "ABS" or the like.

The pretensioning of the seat belt can take place up until the "reference position" shown in FIG. 3. The movement of the belt webbing or the belt reel 10 in the direction towards the "reference position" and the reaching of the "reference position" is detected by the monitoring/sensing device 14 and the command variable generator 2 is correspondingly controlled. When the "reference position" is reached, the pretensioning process is completed. The motor current can then for instance be adjusted in such a manner that a constant restraint force is maintained, as is also described in connection with FIG. 5.

During the belt pretensioning in a potential crash situation or in the pre-crash phase, for instance during an emergency braking or an unsafe dynamic driving situation, the risk exists that after the tightening process, which is caused by the torque supplied by the electric motor 1, the belt retractor 9 locks and the vehicle occupant continues to be restrained in the vehicle seat by the seat belt with the belt webbing which was tightened during the pretensioning. Due to the locking of the belt retractor, this driving situation can continue even when the potential crash situation or pre-crash phase passes without a crash and normal vehicle operation is resumed. Due to the cooperation of the sensor device 4, which detects this normal vehicle operation and supplies corresponding signals, and the monitoring/sensing device 14, which still measures the tightened position of the seat belt 12, an unlocking routine can be automatically initiated. During the unlocking routine, due to the corresponding adjustment of the command variable in the command variable generator 2, the electric motor 1 is supplied with a correspondingly adjusted supply current, which causes a rotation of the belt reel 10 in the tightening direction to the extent that the locking or blocking of the belt reel 10 is reversed. The supply current of the electric motor 1 is carried out in such a manner that the locking of the belt reel is reversed without the vehicle occupant being burdened with an unnecessarily excessive retensioning force. The unlocking routine can also be manually initiated, for instance by operating keys or controls or the like.

Figure 5:
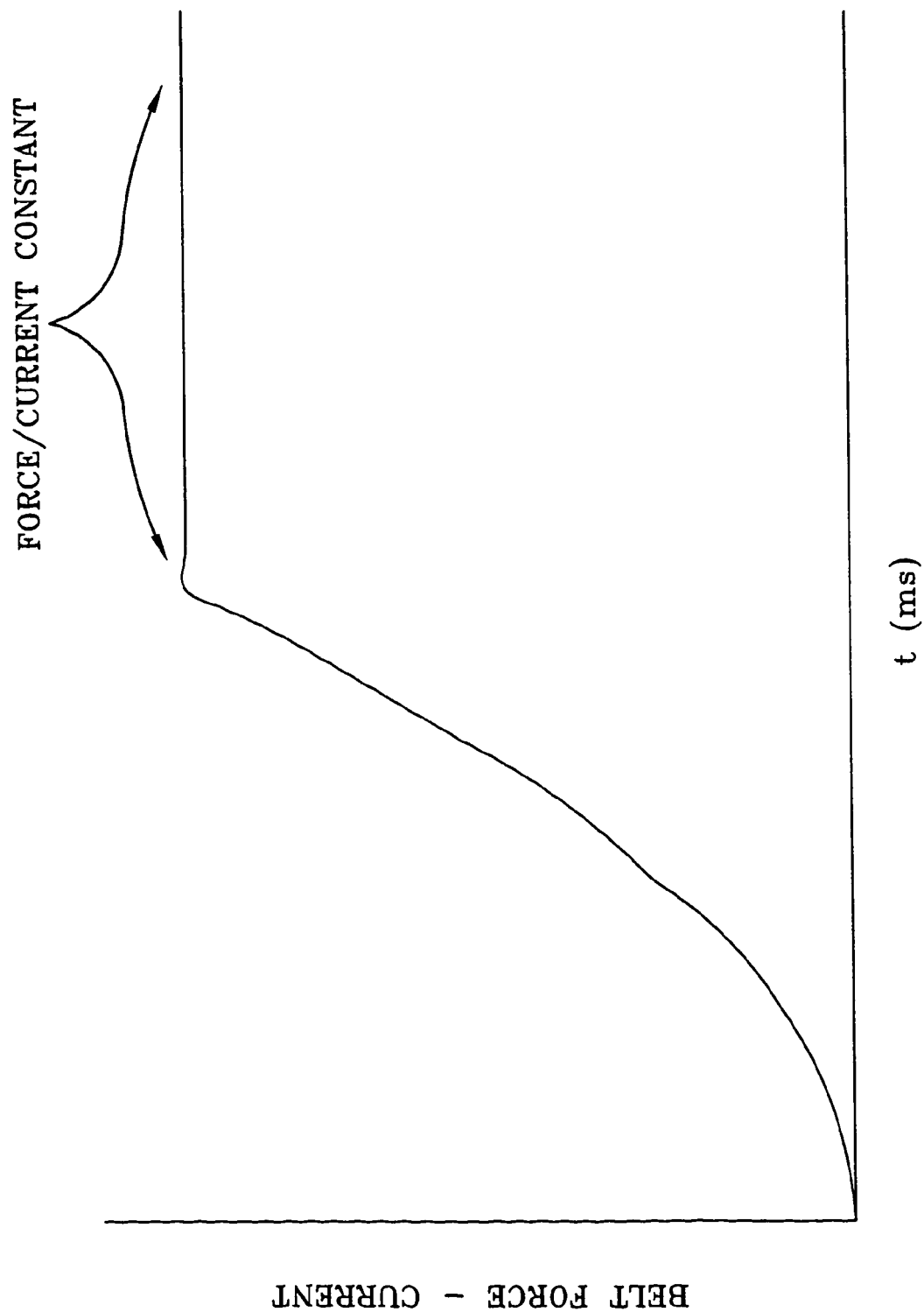
FIG. 5 shows the chronological course of the belt force or the motor current during the tightening of the seat belt and subsequent maintenance of the tightened belt position.

During the pretensioning of the seat belt, in particular during a potential crash situation, a restraint force, which is maintained for a set time frame, can be determined by controlling the supply current, as can be seen for instance in FIG. 5. The stabilization of the supply current or the restraint force can start once the "reference position" shown in FIG. 3 has been reached. If no crash ensues, by adjusting the supply current, the belt force is reduced to the value set for normal vehicle operation conditions, as is for instance shown in FIG. 2. Due to the corresponding stabilization of the command variable during the maintaining of the restraint force and subsequent reduction of the command variable, this control of the supply current and thus of the restraint force of the seat belt can be adjusted.

Figure 6:
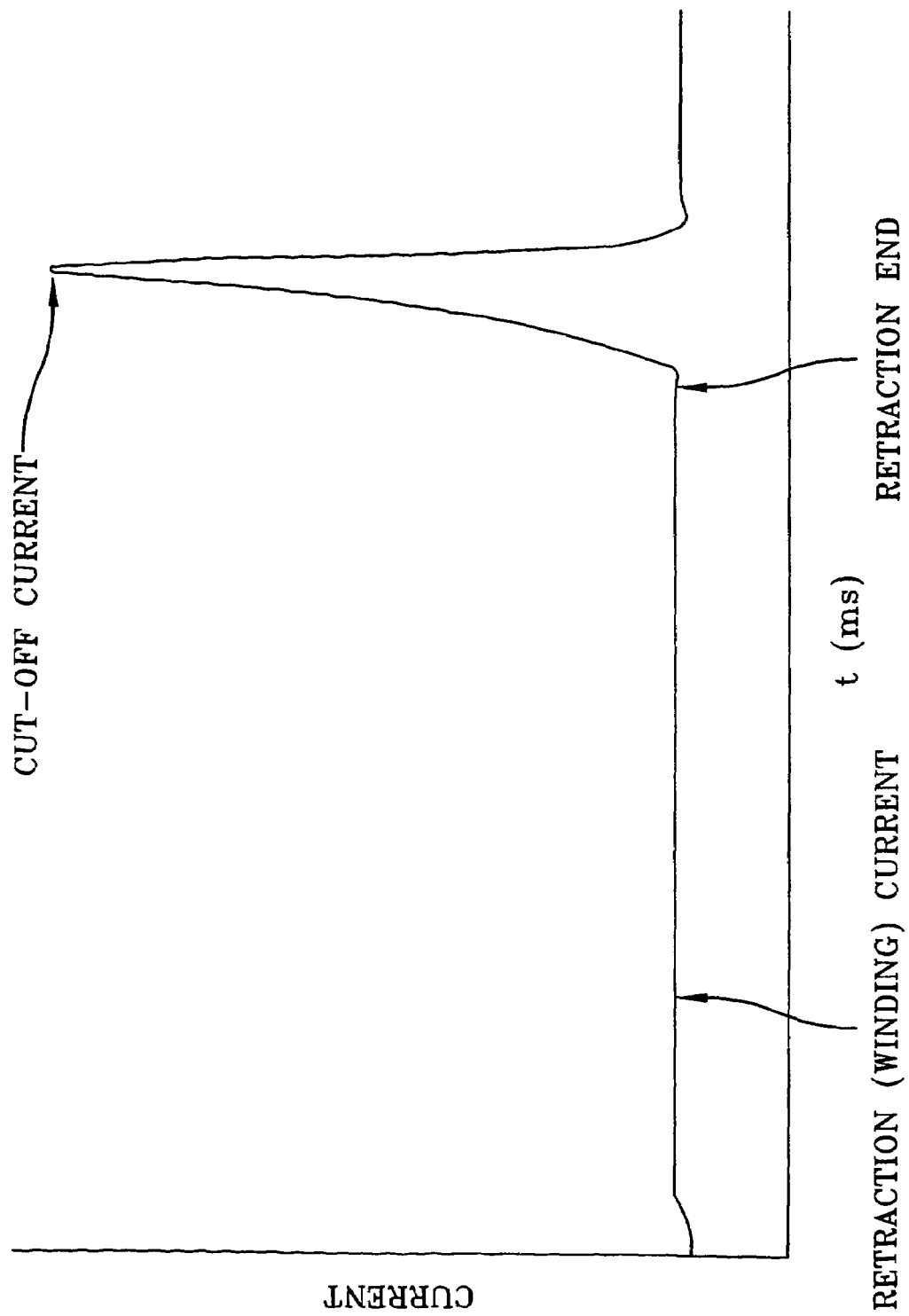
FIG. 6 shows the chronological course of the supply current during the retraction of the seat belt and upon reaching the retraction end.

During the retraction of the belt webbing into the park position, the supply current can be adjusted to a set value (winding current), as can be seen from FIG. 6. At the end of the winding process, the current measuring device 3 detects the increase of the current drawn from the electric motor 1 and thus the complete rewinding of the belt webbing. The current increase (cut-off current) is then evaluated for the disconnection of the supply current, which has supported the winding process.

In addition, in a crash the belt webbing restraint force can be adjusted by a correspondingly controlled energizing of the electric motor 1. In this case the command variable is changed depending on the desired belt force limitation. The latter can take effect in addition to a mechanical, hydraulic force limitation of the belt retractor 9.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

We claim:

1. A method for adjusting a supply current to an electric motor that is situated in a control circuit and produces torque that is transferred to a belt reel of a seat belt retractor of a motor vehicle in dependence on at least one driving situation or a driving condition of the vehicle, comprising the steps of:
    (a) measuring a motor current of the electric motor during the torque generation;
    (b) comparing the motor current measured in step (a) as a controlled variable with a command variable that may be adjusted to different intensities as a function of different driving situations or conditions; and
    (c) adjusting the torque transferred to the belt reel by controlling the supply current for the electric motor situated in the control circuit, wherein the current supplied to the electromotor as a control variable is produced from the comparison between the measured motor current and the command value of the current, in a circuit in which the electromotor is positioned.

2. The method according to claim 1, wherein the command variable is adjusted depending on an amount of slack that is to be removed from a belt webbing of the seat belt.

3. The method according to claim 1, wherein the command variable is adjusted depending on a reference position into which, in a potential crash situation, a vehicle occupant restrained by the seat belt is to be brought by means of the motor torque acting upon the seat belt.

4. The method according to claim 1, wherein due to the adjusted command variable, a constant restraint force on the seat belt or a constant supply current for the electric motor is achieved after a pretensioning of the seat belt.

5. The method according to claim 2, wherein due to the adjusted command variable, a constant restraint force on the seat belt or a constant supply current for the electric motor is achieved after a pretensioning of the seat belt.

6. The method according to claim 3, wherein due to the adjusted command variable, a constant restraint force on the seat belt or a constant supply current for the electric motor is achieved after a pretensioning of the seat belt.

7. The method according to claim 1, wherein the command variable is adjusted depending on an unlocking process that is to performed in which the retensioned belt reel of the belt retractor is unlocked out of a locked or blocked position by applying an additional motor torque in the tightening direction.

8. The method according to claim 1, wherein the command variable is adjusted depending on the weight of a vehicle occupant restrained by the seat belt.

9. A device for adjusting a supply current in the supply current circuit of an electric motor, the torque of which is to be transferred to a belt reel of a seat belt retractor, whereby an adjustment device for the torque is connected to a sensor device for detecting one or more driving situations or driving conditions of the vehicle, wherein the adjustment device predetermines a specific value of the current as a function of a driving situation detected in each case and the electric motor is arranged in a current control circuit that comprises:

(a) a current measuring device for measuring the motor current in a generated torque, (b) a comparator connected to the current measuring device, and compares the predetermined specific value of current with the measured motor current, characterized in that the electromotor is positioned in a control loop, and in that the comparator is connected to a current adjuster in the supply circuit of the electromotor which current adjuster adjusts the supply current as a supply variable of the electromotor as a function of the deviation established in the comparator.

* * * * *